(12) United States Patent
Kawai (10) Patent No.: US 12,300,845 B2
(45) Date of Patent: May 13, 2025

(54) ENERGY STORAGE APPARATUS

(71) Applicant: GS Yuasa International Ltd., Kyoto (JP)

(72) Inventor: Yuta Kawai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 595 days.

(21) Appl. No.: 17/628,481

(22) PCT Filed: Jul. 15, 2020

(86) PCT No.: PCT/JP2020/027546
§ 371 (c)(1),
(2) Date: Jan. 19, 2022

(87) PCT Pub. No.: WO2021/024728
PCT Pub. Date: Feb. 11, 2021

(65) Prior Publication Data
US 2022/0367964 A1 Nov. 17, 2022

(30) Foreign Application Priority Data
Aug. 8, 2019 (JP) .................................. 2019-146485

(51) Int. Cl.
*H01M 50/00* (2021.01)
*H01M 50/30* (2021.01)

(52) U.S. Cl.
CPC ........ *H01M 50/30* (2021.01); *H01M 2220/10* (2013.01)

(58) Field of Classification Search
CPC ...... H01M 50/30; H01M 50/308; Y02E 60/10
See application file for complete search history.

(56) References Cited

U.S. PATENT DOCUMENTS

2011/0039153 A1 2/2011 Nakayama et al.
2011/0135979 A1 6/2011 Nakayama et al.
(Continued)

FOREIGN PATENT DOCUMENTS

CN 102903859 A * 1/2013
CN 203932144 U * 11/2014
(Continued)

OTHER PUBLICATIONS

Peng, Micro Electric Vehicle Battery Box Structure Has Discharge Fan Whose Air Inlet Is Connected With Discharge Groove And Discharge Port Is Connected With Discharge Tube Which Extends Directly To Box Main Portion, Nov. 2014, See the Abstract. (Year: 2014).*

(Continued)

*Primary Examiner* — Anca Eoff
*Assistant Examiner* — Monique M Wills
(74) *Attorney, Agent, or Firm* — MCGINN I.P. LAW GROUP, PLLC (57) ABSTRACT

An energy storage apparatus includes a plurality of energy storage devices each of which includes a case and an outer case that accommodates the plurality of energy storage devices. The outer case has a ventilation chamber and an opening. An exhaust port that guides gas discharged from the case of at least one energy storage device in the plurality of energy storage devices to an inside of the ventilation chamber and a valve member that closes the exhaust port are disposed in the ventilation chamber. The opening guides the gas discharged from the exhaust port from the inside of the ventilation chamber to an outside of the outer case. The opening is formed lower than the exhaust port in the vertical direction.

9 Claims, 7 Drawing Sheets

(56) References Cited

U.S. PATENT DOCUMENTS

| | | |
|---|---|---|
| 2016/0099451 A1 | 4/2016 | Murai et al. |
| 2016/0197324 A1* | 7/2016 | DeKeuster ............ H01M 50/55 |
| | | 429/82 |
| 2017/0047630 A1 | 2/2017 | Cherng |
| 2017/0244081 A1 | 8/2017 | Tononishi et al. |
| 2019/0245172 A1 | 8/2019 | Makabe et al. |

FOREIGN PATENT DOCUMENTS

| | | | | |
|---|---|---|---|---|
| JP | 2007-073298 A | | 3/2007 | |
| JP | 2010-044879 A | | 2/2010 | |
| JP | 2011-175844 A | | 9/2011 | |
| JP | 2012059480 A | * | 3/2012 | |
| JP | 2014-154381 A | | 8/2014 | |
| JP | 3203418 U | | 3/2016 | |
| JP | 2016-062757 A | | 4/2016 | |
| JP | 2016-072171 A | | 5/2016 | |
| JP | 2017-152162 A | | 8/2017 | |
| JP | 2017-152164 A | | 8/2017 | |
| WO | WO-8101078 A1 | * | 4/1981 | .......... H01M 50/114 |
| WO | WO2017/221378 A1 | | 12/2017 | |
| WO | WO-2018077407 A1 | * | 5/2018 | ............ H01M 50/30 |

OTHER PUBLICATIONS

Hu et al., Thin Shell Lead-acid Battery And Manufacturing Method Thereof, Jan. 2013, See the Abstract. (Year: 2013).*

Cilia et al., A Double-Chamber Battery Venting System, May 2018, Lead Acid Storage Battery (Year: 2018).*

Hojo et al., Lead Acid Storage Battery, Mar. 2012, Lead Acid Storage Battery (Year: 2012).*

Pearson, Electric Storage Batteries, Oct. 1980, See the Abstract. (Year: 1980).*

* cited by examiner

ENERGY STORAGE APPARATUS

TECHNICAL FIELD

The present invention relates to an energy storage apparatus including an outer case.

BACKGROUND ART

Patent Document 1 discloses a battery pack BP having a rectangular box-shaped case. A battery module including a plurality of secondary batteries is accommodated inside the case. The inside of the case is partitioned into a vertically lower accommodation space and a vertically upper discharge space by a partition plate, and a communication hole that communicates the accommodation space and the discharge space is made in the partition plate. A through-hole that communicates the discharge space and an outside is made in the case. In this configuration, because a storage portion located vertically below an edge of the communication hole is provided in the partition plate, water that invades the discharge space is stored in the storage portion before reaching the communication hole.

PRIOR ART DOCUMENT

Patent Document

Patent Document 1: JP-A-2014-154381

DISCLOSURE OF THE INVENTION

Problems to be Solved by the Invention

In the energy storage apparatus mounted on various machines, apparatuses, or the like, for example, there is a possibility that the entire outer case of the energy storage apparatus is submerged during generation of a natural disaster or the like. In this case, there is a possibility that an unsafe event such as a short circuit is generated due to the water reaching the energy storage device accommodated in the outer case. Accordingly, desirably the energy storage apparatus has such a waterproof property that the energy storage device in the inside of the outer case can be protected from the water even when the energy storage apparatus is submerged. In this regard, in a battery pack BP of Patent Document 1, when an upper end of the through-hole of the case is soaked with the water, the water that invades from the through-hole may reach the communication hole beyond the storage portion, and as a result, the secondary battery in the case may be splashed with the water.

The present invention has been made by the inventor of the present application to newly focus on the above problems, and an object of the present invention is to provide an energy storage apparatus including an outer case and having improved safety.

Means for Solving the Problems

An energy storage apparatus according to one aspect of the present invention includes: a plurality of energy storage devices each of which includes a case; and an outer case that accommodates the plurality of energy storage devices. The outer case includes: a ventilation chamber in which an exhaust port through which gas discharged from the case of at least one energy storage device in the plurality of energy storage devices is guided to an inside of the ventilation chamber and a valve member that closes the exhaust port are disposed; and an opening that guides the gas discharged from the exhaust port from the inside of the ventilation chamber to an outside of the outer case, and the opening is formed lower than the exhaust port in a vertical direction.

Advantages of the Invention

According to the present invention, the energy storage apparatus that includes the outer case and has the improved safety can be provided.

MODE FOR CARRYING OUT THE INVENTION

An energy storage apparatus according to one aspect of the present invention includes: a plurality of energy storage devices each of which includes a case; and an outer case that accommodates the plurality of energy storage devices. The outer case includes: a ventilation chamber in which an exhaust port through which gas discharged from the case of at least one energy storage device in the plurality of energy storage devices is guided to an inside of the ventilation chamber and a valve member that closes the exhaust port are disposed; and an opening that guides the gas discharged from the exhaust port from the inside of the ventilation chamber to an outside of the outer case, and the opening is formed lower than the exhaust port in a vertical direction.

According to this configuration, even when water flows into the ventilation chamber from the opening, the opening is located lower than the exhaust port disposed in the ventilation chamber and the gas (generally air) exists in the ventilation chamber, so that the water is hardly accumulated up to the height to the exhaust port. Accordingly, even when a situation where the outer case is immersed in the water is generated, the possibility that the water reaches the energy storage devices inside the outer case is prevented. The possibility that the water invades from the exhaust port into the inside of the outer case can be reduced without depending on the existence or the level of airtightness or watertightness of the valve member disposed in the exhaust port. As described above, the energy storage apparatus of the aspect is an energy storage apparatus with improved safety.

Preferably the exhaust port includes: a distal end exhaust portion formed at an upper end of a cylindrical body provided inside the ventilation chamber; and a side surface exhaust portion that penetrates a side wall of the cylindrical body, and the opening is formed lower than the side surface exhaust portion in the vertical direction.

According to this configuration, the exhaust port includes the distal end exhaust portion and the side surface exhaust portion having different directions from each other, so that the gas discharged from at least one energy storage device can be efficiently guided to the inside of the ventilation chamber. In the distal end exhaust portion and the side surface exhaust portion, the side surface exhaust portion located at the lower position is located higher than the opening, so that the water hardly invades through the side surface exhaust portion.

Preferably the valve member is a cap-shaped member that closes the distal end exhaust portion and the side surface exhaust portion, and the opening is formed lower than a lower end of the valve member in the vertical direction.

According to this configuration, the water flowing into the ventilation chamber from the opening hardly reaches the lower end of the valve member, so that the possibility that the water crawls up due to a capillary phenomenon of the gap between the lower end edge of the valve member and the cylindrical body is reduced. Accordingly, the invasion of the water into the inside of the outer case from the side surface exhaust portion provided in the side wall of the cylindrical body is prevented.

Preferably each of the plurality of energy storage devices is disposed such that a gas release valve included in the case of the energy storage device faces upward, and the ventilation chamber is disposed higher than the plurality of energy storage devices in the vertical direction.

According to this configuration, the gas discharged from the upward gas release valve of each of the plurality of energy storage devices can be efficiently discharged to the outside of the outer case through the ventilation chamber while the possibility that the water reaches the plurality of energy storage devices through the ventilation chamber is reduced.

Preferably the exhaust port and the opening are disposed at different positions in a lateral direction orthogonal to the vertical direction.

According to this configuration, the heights of the exhaust port and the opening can be differentiated while the width in the height direction of the ventilation chamber is kept as small as possible. That is, the structure that improves the safety from the viewpoint of the waterproof property can be included in the energy storage apparatus without increasing the size of the energy storage apparatus.

Hereinafter, an energy storage apparatus according to an embodiment (including a modification example of the present invention) will be described with reference to the drawings. The embodiment described below illustrates a comprehensive or specific example. Numerical values, shapes, materials, components, dispositions of the components, connection forms of the components, and the like described in the following embodiment are merely examples, and are not intended to limit the present invention. In each of the drawings, dimensions and the like are not strictly illustrated.

In the following description and drawings, an arrangement direction of a plurality of energy storage devices, a direction opposed to a long side surface of a case of the energy storage device, or a thickness direction of the case is defined as an X-axis direction. The arrangement direction of an electrode terminal in one energy storage devices or the direction opposed to a short side surface of the case of the energy storage device is defined as a Y-axis direction. The arrangement direction of a main body and a lid body in an outer case of the energy storage apparatus, the arrangement direction of the energy storage device and the bas bar, or a vertical direction is defined as a Z-axis direction. The X-axis direction, the Y-axis direction, and the Z-axis direction intersect with one another (hereinafter, orthogonal to one another in the embodiment). Although it may be conceivable that the Z-axis direction is not in the vertical direction depending on a mode of use, hereinafter the Z-axis direction is described as the vertical direction for convenience of explanation.

In the following embodiments, expressions indicating relative directions or postures such as parallel and orthogonal are sometimes used, but strictly, these expressions also include a case where these expressions are not the directions or postures. For example, two directions orthogonal to each other not only means that the angle formed by the two directions is 90°, but also means that the two directions are substantially orthogonal to each other, namely, the two directions include a difference of, for example, about several percent. In the following description, for example, a positive side in the X-axis direction indicates an arrow direction side of the X-axis, and a negative side in the X-axis direction indicates an opposite side to the positive side in the X-axis direction. The same applies to the Y-axis direction and the Z-axis direction.

Embodiment

[1. General Description of Energy Storage Apparatus]

Figure 1:
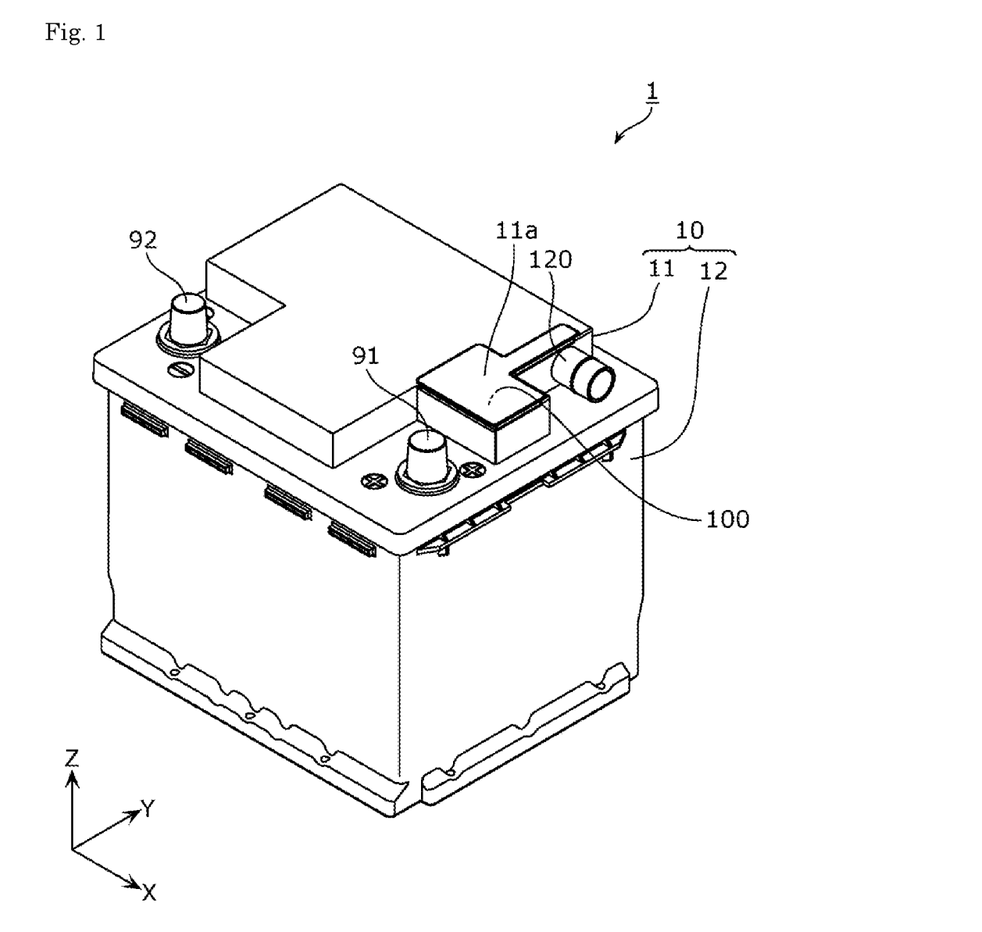
FIG. 1 is a perspective view illustrating an appearance of an energy storage apparatus according to an embodiment.
Figure 2:
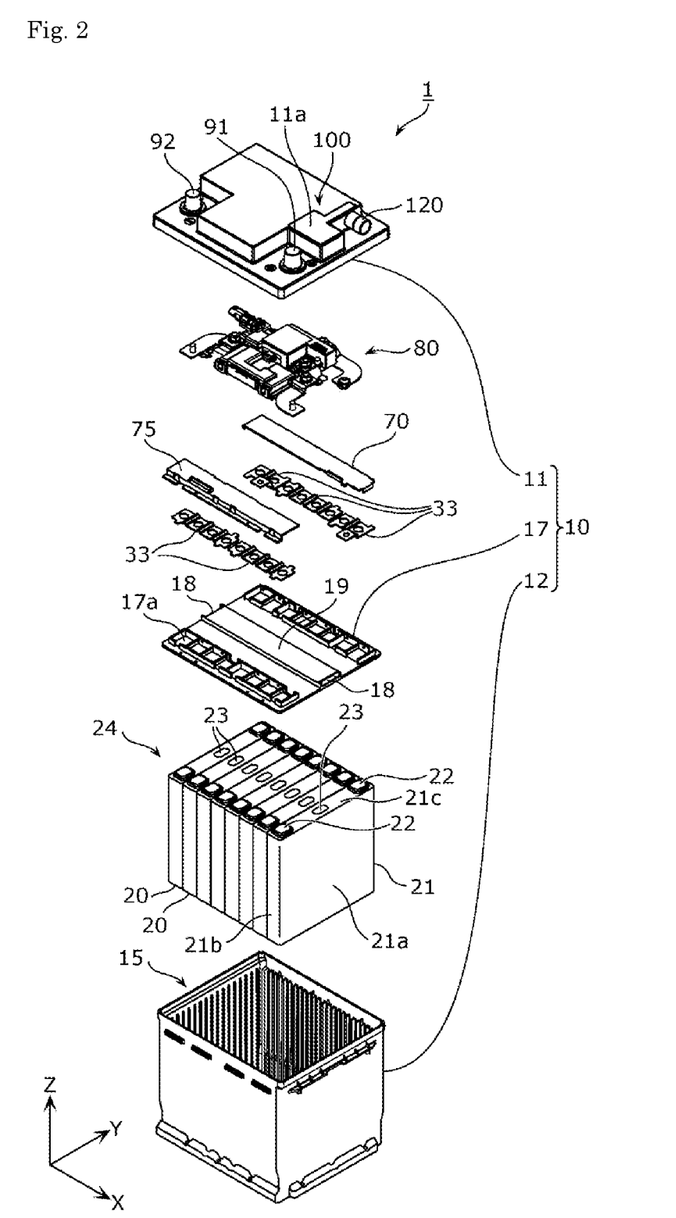
FIG. 2 is an exploded perspective view illustrating each component when the energy storage apparatus of the embodiment is disassembled.

A general description of an energy storage apparatus 1 of the embodiment will be given with reference to FIGS. 1 and 2. FIG. 1 is a perspective view illustrating an appearance of the energy storage apparatus 1 of the embodiment. FIG. 2 is an exploded perspective view illustrating each component when the energy storage apparatus 1 of the embodiment is disassembled.

The energy storage apparatus 1 is an apparatus capable of charging electricity from the outside and discharging electricity to the outside, and has a substantially rectangular parallelepiped shape in the embodiment. The energy storage apparatus 1 is a battery module (assembled battery) used for a power storage application, a power supply application, and the like. Specifically, for example, the energy storage apparatus 1 is used as a battery for driving a moving body such as automobiles, motorcycles, watercrafts, vessels, snowmobiles, agricultural machines, construction machines, and railroad vehicles for electric railroad or starting an engine. Examples of the automobiles include an electric vehicle (EV), a hybrid electric vehicle (HEV), a plug-in hybrid electric vehicle (PHEV), and a gasoline automobile. Examples of the railway vehicles for electric railway include a train, a monorail, and a linear motor car. The energy storage apparatus 1 can also be used as a stationary battery or the like used for home use, a generator, or the like.

As illustrated in FIG. 1 and FIG. 2, the energy storage apparatus 1 includes a plurality of energy storage devices 20 and an outer case 10 that accommodates the plurality of energy storage devices 20. In the embodiment, eight energy storage devices 20 are accommodated in the outer case 10. The number of energy storage devices 20 included in the energy storage apparatus 1 is not limited to eight. The energy storage apparatus 1 may include the plurality of energy storage devices 20. In the embodiment, one energy storage device unit 24 is formed of the plurality of energy storage devices 20 disposed in the X-axis direction. The energy storage device unit 24 may include a spacer, an insulating film, and the like (not illustrated).

The outer case 10 includes a main body 12 that accommodates the energy storage device unit 24, a bus bar plate 17 that is disposed above the energy storage device unit 24, and a lid body 11 that is disposed so as to cover an upper portion of the bus bar plate 17. A plurality of bus bars 33 are held on the bus bar plate 17, and the plurality of bus bars 33 are covered with bus bar covers 70 and 75. A connection unit 80 including a control circuit and the like is disposed between the bus bar plate 17 and the lid body 11.

The outer case 10 is a rectangular (box-shaped) case (module case) constituting an outer shell of the energy storage apparatus 1. That is, the outer case 10 is a member that fixes the energy storage device unit 24, the bus bar plate 17, and the like to a predetermined position to protect the energy storage device unit 24 and the bus bar plate 17 against an impact and the like. For example, the outer case 10 is formed of an insulating member such as polycarbonate (PC), polypropylene (PP), polyethylene (PE), polystyrene (PS), a polyphenylene sulfide resin (PPS), polyphenylene ether (PPE (including modified PPE)), polyethylene terephthalate (PET), polybutylene terephthalate (PBT), polyether ether ketone (PEEK), tetrafluoroethylene-perfluoroalkyl vinyl ether (PFA), polytetrafluoroethylene (PTFE), polyether sulfone (PES), an ABS resin, or a composite material thereof or an insulation-coated metal.

The lid body 11 included in the outer case 10 is a rectangular member that closes a main body opening 15 of the main body 12, and includes an external terminal 91 on a positive electrode side and an external terminal 92 on a negative electrode side. The external terminals 91 and 92 are electrically connected to the plurality of energy storage devices 20 through the connection unit 80 and the bus bar 33, and the energy storage apparatus 1 charges the electricity from the outside through the external terminals 91 and 92, and discharges the electricity to the outside through the external terminals 91 and 92. For example, the external terminals 91 and 92 are made of a metal conductive member such as aluminum or an aluminum alloy.

The lid body 11 further includes a ventilation chamber 100 through which gas moving from one of the inside and the outside of the outer case 10 to the other passes and an exhaust tube 120 connected to the ventilation chamber 100. The gas inside the outer case 10 reaches the inside of the ventilation chamber 100 through the exhaust port provided in the ventilation chamber 100, and then is released to the outside of the outer case 10 through the opening that communicates the ventilation chamber 100 and the exhaust tube 120 and the exhaust tube 120. In FIGS. 1 and 2, the ventilation chamber 100 is covered with a ventilation chamber cover 11a of the lid body 11. The constitution of the ventilation chamber 100 will be described later with reference to FIGS. 3 to 7.

The main body 12 is a bottomed rectangular cylindrical housing (casing) in which a main body opening 15 is formed to accommodate the energy storage device unit 24.

The energy storage device 20 is a secondary battery (battery cell) that can charge and discharge the electricity, more specifically a nonaqueous electrolyte secondary battery such as a lithium ion secondary battery. The energy storage device 20 has a flat, rectangular parallelepiped (prismatic) shape. In the embodiment, eight energy storage devices 20 are arrayed in the X-axis direction as described above.

The energy storage device 20 is not limited to the nonaqueous electrolyte secondary battery, but may be a secondary battery except for the nonaqueous electrolyte secondary battery or a capacitor. The energy storage device 20 may be a primary battery that can use stored electricity without being charged by a user. The energy storage device 20 may be a battery in which a solid electrolyte is used. In the embodiment, the energy storage device 20 having a rectangular parallelepiped shape (square shape) is illustrated. However, the shape of the energy storage device 20 is not limited to the rectangular parallelepiped shape, but may be a polygonal columnar shape, a cylindrical shape, an oval columnar shape or the like other than the rectangular parallelepiped shape. Furthermore, a pouch type energy storage device may be provided in the energy storage apparatus 1 as the energy storage device 20.

In the embodiment, the energy storage device 20 includes a metal case 21. The case 21 is a prismatic case including a pair of long side surfaces 21a facing each other and a pair of short side surfaces 21b facing each other. An electrode assembly, a current collector, an electrolyte solution, and the like are accommodated in the case 21. In the embodiment, the plurality of energy storage devices 20 are arranged in a row in the X-axis direction in a posture where the long side surfaces 21a are directed in the X-axis direction (a posture where the short side surfaces 21b are parallel to the X-axis direction).

A metal electrode terminal 22 (a positive electrode terminal and a negative electrode terminal) electrically connected to the electrode assembly inside the case 21 is provided on a lid plate 21c of the case 21. The electrode terminal 22 (the positive electrode terminal and the negative electrode terminal) is disposed so as to protrude from the lid plate 21c of the case 21 toward the side of the bus bar plate 17 (upward, namely, toward the positive side of the Z-axis direction). A gas release valve 23 that releases the gas inside the case 21 to the outside is further provided in the lid plate 21c of the case 21. The gas release valve 23 has a function of releasing (opening) the gas in the case 21 to the outside of the case 21 when internal pressure of the case 21 increases due to vaporization of the electrolyte solution in the case 21. The gas release valve 23 having such a function is provided in each of the plurality of energy storage devices 20. In the embodiment, as illustrated in FIG. 2, each of the plurality of energy storage devices 20 is disposed in a posture in which the gas release valve 23 faces the positive side in the Z-axis direction.

The bus bar 33 is a rectangular plate member that is disposed on at least two energy storage devices 20 while the bus bar 33 is held on the bus bar plate 17, and electrically connects the electrode terminals 22 of the at least two energy storage devices 20 to each other. The material of the bus bar 33 is not particularly limited, but may be formed of a metal such as aluminum, an aluminum alloy, copper, a copper alloy, or stainless steel or a combination thereof, or a conductive member other than metal. In the embodiment, using five bus bars 33, two energy storage devices 20 are connected in parallel to form four sets of energy storage device groups, and the four sets of energy storage device groups are connected in series. The aspect of electric connection of the eight energy storage devices 20 is not particularly limited, and all of the eight energy storage devices 20 may be connected in series by seven bus bars.

The connection unit 80 is a unit including a plurality of bus bars and a control board, and electrically connects the energy storage device unit 24 and the external terminals 91 and 92. The control board included in the connection unit 80 includes a plurality of electric components, and a detection circuit that detects a state of each energy storage device 20, a control circuit that controls charge and discharge, and the like are formed by the plurality of electric components. In the embodiment, the connection unit 80 is fixed to the bus bar plate 17.

The bus bar plate 17 is a resin member that holds the bus bars 33. More specifically, the bus bar plate 17 is a member that holds the plurality of bus bars 33, the connection unit 80, other wirings (not illustrated), and the like, and can perform position regulation and the like of these members. A plurality of bus bar openings 17a that hold the plurality of bus bars 33 and expose a part of each of the plurality of bus bars 33 to the side of the plurality of energy storage devices 20 are provided in the bus bar plate 17.

The bus bar plate 17 is fixed to a surface of the plurality of energy storage devices 20 on which the electrode terminals 22 are disposed with an adhesive. The position of the adhesive may be continuously disposed with respect to the surface of the continuous lid plate 21c of the plurality of energy storage devices 20, or may be intermittently disposed for each surface of the lid plate 21c of the plurality of energy storage devices 20. A sheet-like material, a liquid material, or the like can be adopted as the material of the adhesive.

At the center of the bus bar plate 17 in the Y-axis direction, a path forming portion 19 extending in the X-axis direction while protruding toward the positive side in the Z-axis direction is provided along the array of the gas release valves 23 of the plurality of energy storage devices 20. The path forming portion 19 covers all the gas release valves 23 from the positive side in the Z-axis direction. Bonding surfaces extending in the X-axis direction and facing the negative side in the Z-axis direction are formed in portions of the bus bar plate 17 on the positive side in the Y-axis direction and the negative side in the Y-axis direction of the path forming portion 19 between the path forming portion 19 and the bus bar opening 17a. The adhesive is disposed along the X-axis direction between the surface of the lid plate 21c and the bonding surface of the bus bar plate 17 on both the positive side in the Y-axis direction and the negative side in the Y-axis direction of the path forming portion 19. The adhesive surface of the bus bar plate 17 abuts on the surface of the lid plate 21c with the adhesive interposed therebetween. Thus, an exhaust path of the gas discharged from the energy storage device 20 by the gap between the path forming portion 19 and the surface of the lid plate 21c is formed along the X-axis direction.

As illustrated in FIG. 2, at each of the ends in the longitudinal direction of the path forming portion 19, a path outlet 18 is provided on both the positive side in the X-axis direction and the negative side in the X-axis direction. In the exhaust path, a main escape path of the gas discharged from the energy storage device 20 becomes the path outlet 18 due to the fact that the inner surface of the path forming portion 19 is located on the positive side in the Z-axis direction while the surface of the lid plate 21c is located on the negative side in the Z-axis direction, and that the adhesive is disposed on both sides of the path forming portion 19 in the Y-axis direction. For this reason, the gas discharged from the energy storage device 20 preferentially passes through the path outlet 18 and is discharged to the outside of the outer case 10 through the ventilation chamber 100 and the exhaust tube 120. The path outlet 18 is provided at a position separated from the connection unit 80 without overlapping the connection unit 80 when viewed from the Z-axis direction. Consequently, because the gas immediately after being discharged from the gas release valve 23 of the energy storage device 20 is not discharged toward the connection unit 80, the damage to the connection unit 80 by the gas discharged from the path outlet 18 can be reduced.

The bus bar plate 17 configured as described above is fixed to the main body 12 of the outer case 10 by a predetermined method such as adhesion or heat welding.

Each of the bus bar covers 70 and 75 is a resin member covering the plurality of bus bars 33 from above, and plays a role of electrically insulating the plurality of bus bars 33 and the connection unit 80 from each other.

[2. Configuration of Ventilation Chamber]

Figure 3:
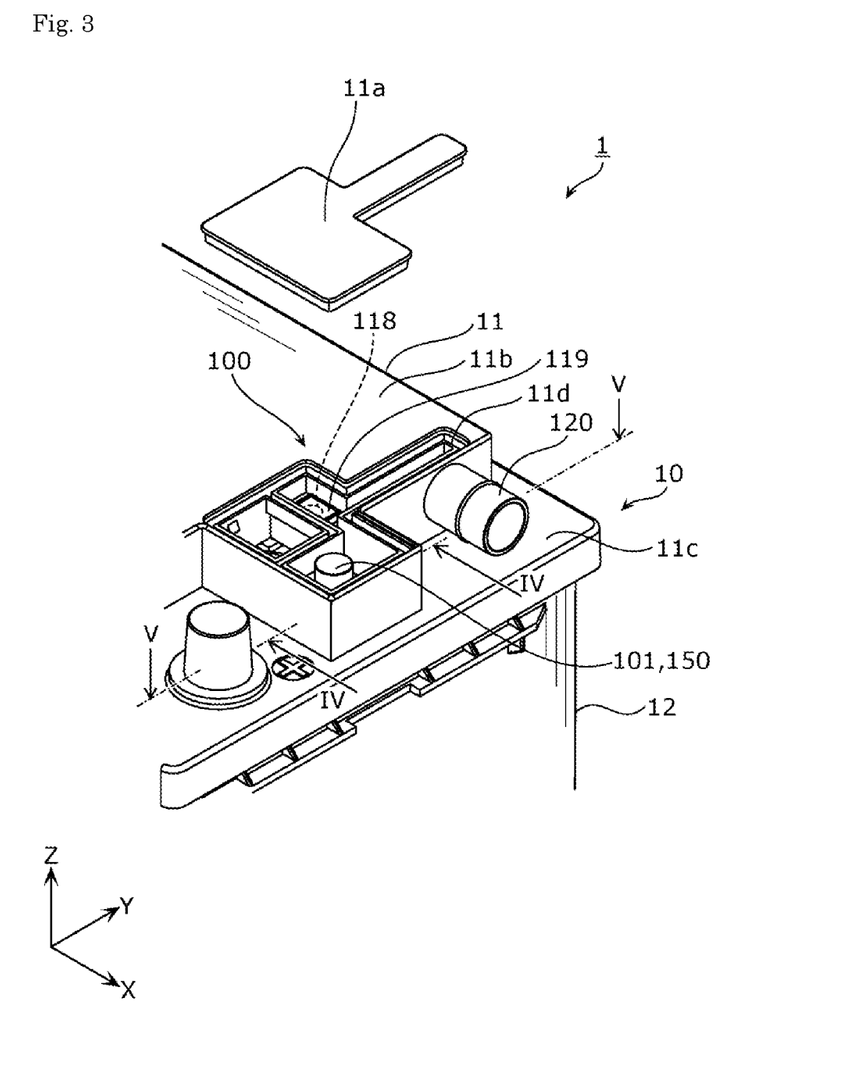
FIG. 3 is a perspective view illustrating a configuration of a ventilation chamber and a periphery of the ventilation chamber of the embodiment.
Figure 4:
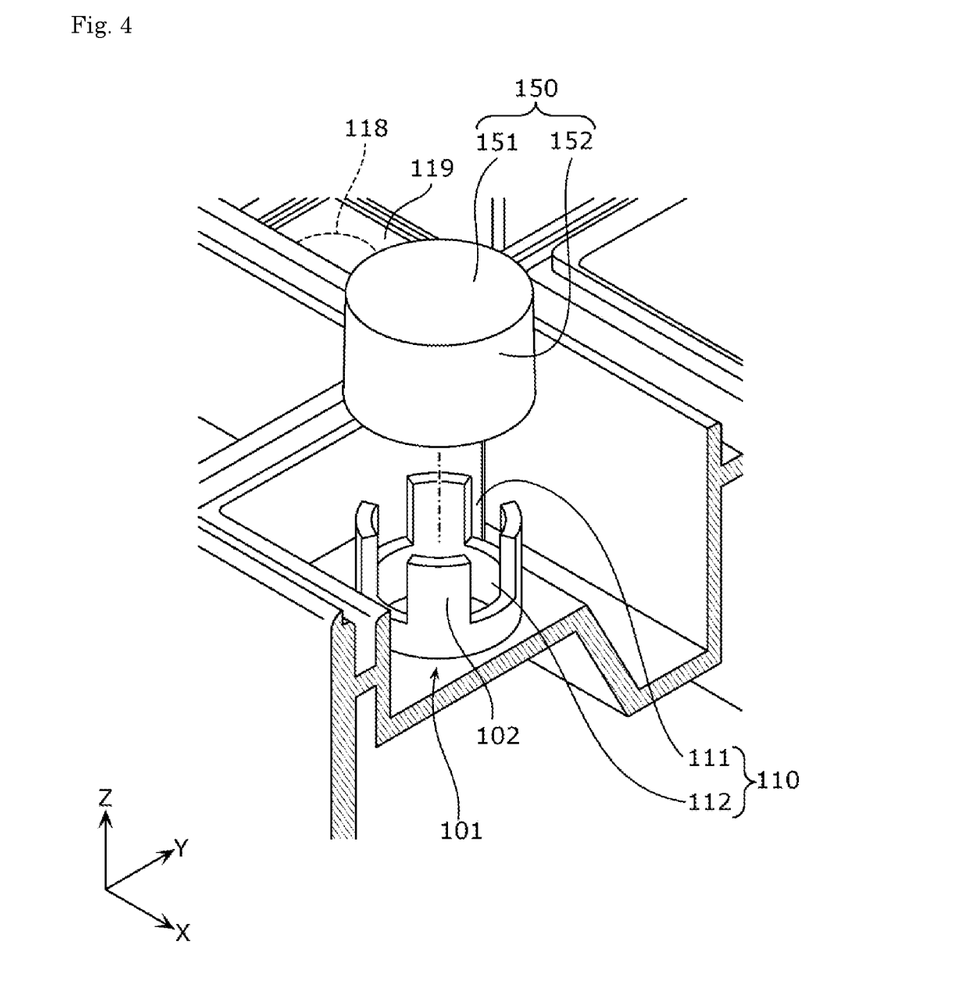
FIG. 4 is an enlarged perspective view illustrating a cylindrical body of the embodiment.
Figure 5:
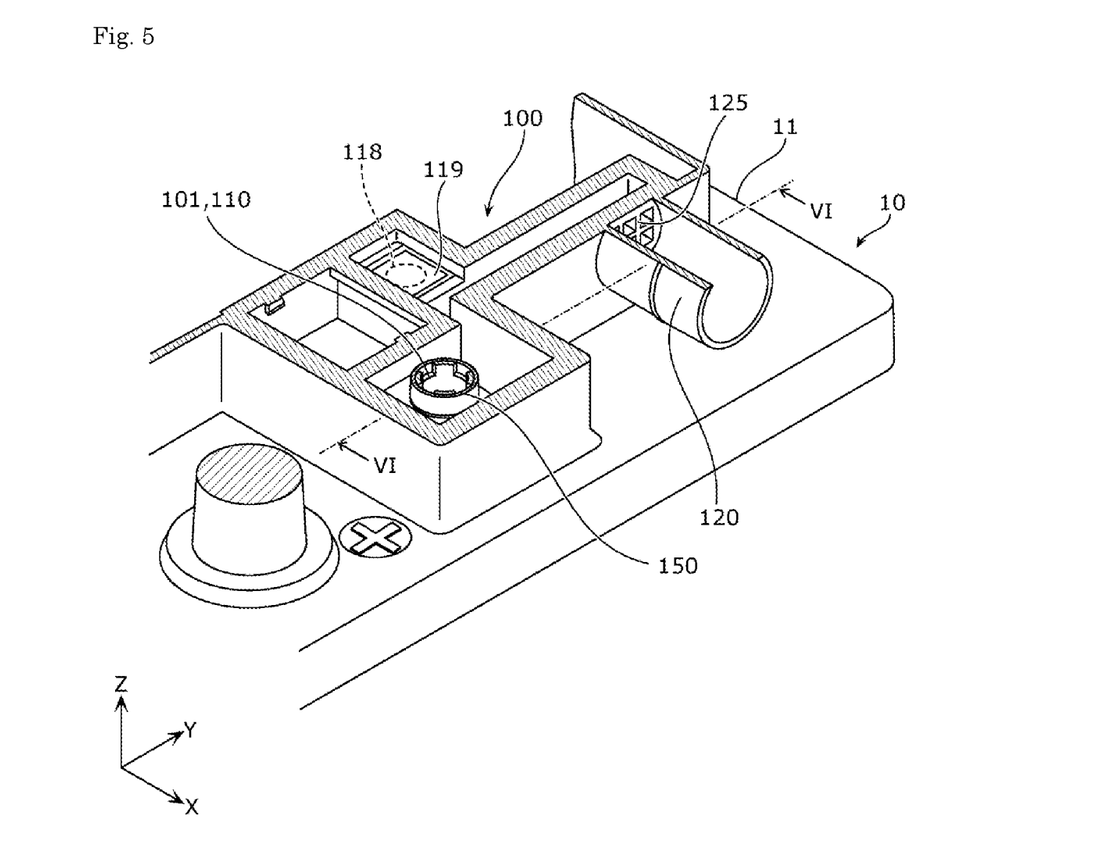
FIG. 5 is an enlarged perspective view illustrating the configuration ventilation chamber and a periphery of the ventilation chamber of the embodiment.

The configuration of the ventilation chamber 100 in the energy storage apparatus 1 configured as described above will be described with reference to FIGS. 3 to 5. FIG. 3 is a perspective view illustrating a configuration of the ventilation chamber 100 and a periphery of the ventilation chamber 100 of the embodiment. FIG. 4 is an enlarged perspective view illustrating the cylindrical body 101 of the embodiment. Specifically, FIG. 4 illustrates substantially the entire cylindrical body 101 having an exhaust port 110 while the outer case 10 is cut along a YZ-plane passing through a line IV-IV in FIG. 3. FIG. 4 illustrates a state in which a valve member 150 is removed from the cylindrical body 101 so as to clearly illustrate the configuration of the cylindrical body 101. FIG. 5 is an enlarged perspective view illustrating the configuration of ventilation chamber 100 and the periphery of the ventilation chamber 100 of the embodiment. Specifically, FIG. 5 illustrates the entire ventilation chamber 100 while the outer case 10 is cut along an XY plane passing through a line V-V in FIG. 3. In FIG. 5, only the ventilation chamber 100 and the periphery of the ventilation chamber 100 in the lid body 11 of the outer case 10 are illustrated, and illustration of other portions of the outer case 10 is omitted.

As illustrated in FIGS. 3 to 5, the ventilation chamber 100 is provided in the lid body 11 of the outer case 10. The exhaust port 110 and the valve member 150 that closes the exhaust port 110 are disposed in the ventilation chamber 100. The exhaust port 110 is a member that guides the gas discharged from the case 21 of at least one energy storage device 20 out of the plurality of energy storage devices 20 housed in the outer case 10 to the inside of the ventilation chamber 100 through the exhaust path by the path forming portion 19. The exhaust port 110 is a through-hole that communicates the inside of the ventilation chamber 100 and the inside of the outer case 10 (a portion other than the ventilation chamber 100), and specifically, is formed in the cylindrical body 101 provided in the ventilation chamber 100. The exhaust port 110 is normally closed by the valve member 150.

In the embodiment, the valve member 150 is a cap-shaped member formed of an elastic material having high heat resistance such as silicone rubber, and is attached to the distal end of the cylindrical body 101. In the embodiment, as illustrated in FIG. 4, the exhaust port 110 is formed in a cutaway shape from the distal end (the end on the positive side in the Z-axis direction) of the cylindrical body 101 in a side wall 102 of the cylindrical body 101, and includes a side surface exhaust portion 112 penetrating the side wall 102. In the side wall 102, a plurality of side surface exhaust portions 112 are provided in the circumferential direction. More specifically, in the embodiment, four side surface exhaust portions 112 having the same shape are evenly arranged in the circumferential direction.

In the embodiment, the exhaust port 110 further includes a distal end exhaust portion 111 provided at the distal end of the cylindrical body 101. That is, the opening at the distal end of the cylindrical body 101 functions as the distal end exhaust portion 111. In the embodiment, a peripheral edge of the distal end exhaust portion 111 forming the opening orthogonal to the axial direction of the cylindrical body 101 (matched with the Z-axis direction in the embodiment) and the upper end of the side surface exhaust portion 112 are connected. That is, the distal end exhaust portion 111 and the side surface exhaust portion 112 are continuously provided in the cylindrical body 101.

The cylindrical body 101 configured as described above is covered with the cap-shaped valve member 150, so that the exhaust port 110 of the cylindrical body 101 is covered with the valve member 150. Specifically, the valve member 150 includes a front surface portion 151 that covers the distal end exhaust portion 111 and an outer periphery 152 that covers at least a part of the side wall 102 including the side surface exhaust portion 112. In the embodiment, the outer periphery 152 covers all of the four side surface exhaust portions 112 formed in the side wall 102. In this state, the valve member 150 is brought into close contact with the cylindrical body 101 by elastic force (restoring force) of the valve member 150 made of an elastic material. That is, the valve member 150 is in a closed state in which the exhaust port 110 is closed.

When the valve member 150 is in the closed state as described above, it is assumed that the gas is discharged from at least one energy storage device 20. In this case, when the internal pressure of the outer case 10 increases and exceeds a predetermined value, the outer periphery 152 of the valve member 150 receives the pressure (internal pressure) of the gas at the positions of the plurality of side surface exhaust portions 112 and is deformed so as to expand outward. As a result, the valve member 150 transitions from the closed state to the open state by opening at least a part of the exhaust port 110. Thus, the gas is released from the exhaust port 110 of the cylindrical body 101 into the ventilation chamber 100. The gas released into the ventilation chamber 100 is released to the outside of the energy storage apparatus 1 through the exhaust tube 120 communicating the ventilation chamber 100. The ventilation chamber cover 11a is disposed at the position facing the front surface portion 151 of the valve member 150, so that the upward movement of the valve member 150 is restricted by the ventilation chamber cover 11a. In the state where the gap exists between the valve member 150 and the ventilation chamber cover 11a, even when the valve member 150 moves upward by receiving the internal pressure of the outer case 10 to open the distal end exhaust portion 111, the movement of the valve member 150 is restricted by being pressed by the ventilation chamber cover 11a. That is, detachment of the valve member 150 from the cylindrical body 101 is prevented by the ventilation chamber cover 11a.

A vent hole 118 provided in the ventilation chamber 100 is a hole through which the gas is exchanged between the inside and the outside of the outer case 10 in the normal state. Specifically, the vent hole 118 is closed by a ventilation waterproof film 119 having a function of allowing the gas to pass and not allowing the liquid to pass. Specifically, the ventilation waterproof film 119 is a film made of a waterproof and moisture-permeable material having waterproofness and gas permeability (moisture permeability) such as Gore-Tex (registered trademark) and TEMISH (registered trademark). Thus, when a difference between an internal pressure and an external pressure of the outer case 10 is generated due to a change in environmental temperature of the energy storage apparatus 1 at the normal time or the like, exchange of the gas is performed through the ventilation waterproof film 119, and accordingly, pressure balance between the inside and the outside of the outer case 10 can be implemented. Even when external water reaches the position of the vent hole 118 through the exhaust tube 120, the water cannot pass through the ventilation waterproof film 119, so that the water is prevented from invading the inside of the outer case 10.

An opening 125 is provided at the end of the ventilation chamber 100 on the side opposite to the end where the exhaust port 110 is provided, and the exhaust tube 120 is disposed on the side opposite to the ventilation chamber 100 with the opening 125 interposed therebetween. That is, the opening 125 exists at the back of the exhaust tube 120, and the gas flowing from the exhaust port 110 into the ventilation chamber 100 is discharged to the outside of the outer case 10 through the opening 125 and the exhaust tube 120. As described above, the opening 125 is provided in the wall that partitions the inside and the outside of the ventilation chamber 100, and can guide the gas discharged from the exhaust port 110 from the inside of the ventilation chamber 100 to the outside of the outer case 10. That is, it can be expressed that the exhaust port 110 guiding the gas discharged from the case 21 of at least one energy storage device 20 to the inside of the ventilation chamber 100, the valve member 150 closing the exhaust port 110, and the opening 125 guiding the gas discharged from the exhaust port 110 from the inside of the ventilation chamber 100 to the outside of the outer case 10 are disposed in the ventilation chamber 100. In the embodiment, opening 125 includes a plurality of through-holes made in a net-like shape, and penetrating the wall partitioning the inside and the outside of the ventilation chamber 100. That is, the opening 125 has a mesh shape such that foreign matter (individual) does not invade the inside of the ventilation chamber 100 from the opening 125 while an opening area through which the gas is efficiently discharged is secured. It is not essential that the opening 125 includes the plurality of through-holes, but the opening 125 may include at least one through-hole.

[3. Positional Relationship Between Exhaust Port and Opening]

The ventilation chamber 100 configured as described above is covered with the ventilation chamber cover 11a, and the ventilation chamber cover 11a is fixed to the lid body 11 by a predetermined method such as welding or adhesion. Thus, the upper surface opening of the ventilation chamber 100 is sealed by the ventilation chamber cover 11a. Accordingly, when the water flows into the ventilation chamber 100, an air reservoir is formed in the upper portion of the ventilation chamber 100, and the inflow of the water is stopped by the pressure of the air reservoir. As a result, the rise of the water level inside the ventilation chamber 100 is stopped. In the embodiment, the above-described characteristic in the ventilation chamber 100 are used to prevent the invasion of the water from the exhaust port 110 into the inside of the outer case 10. This structure will be further described with reference to FIG. 6.

Figure 6:
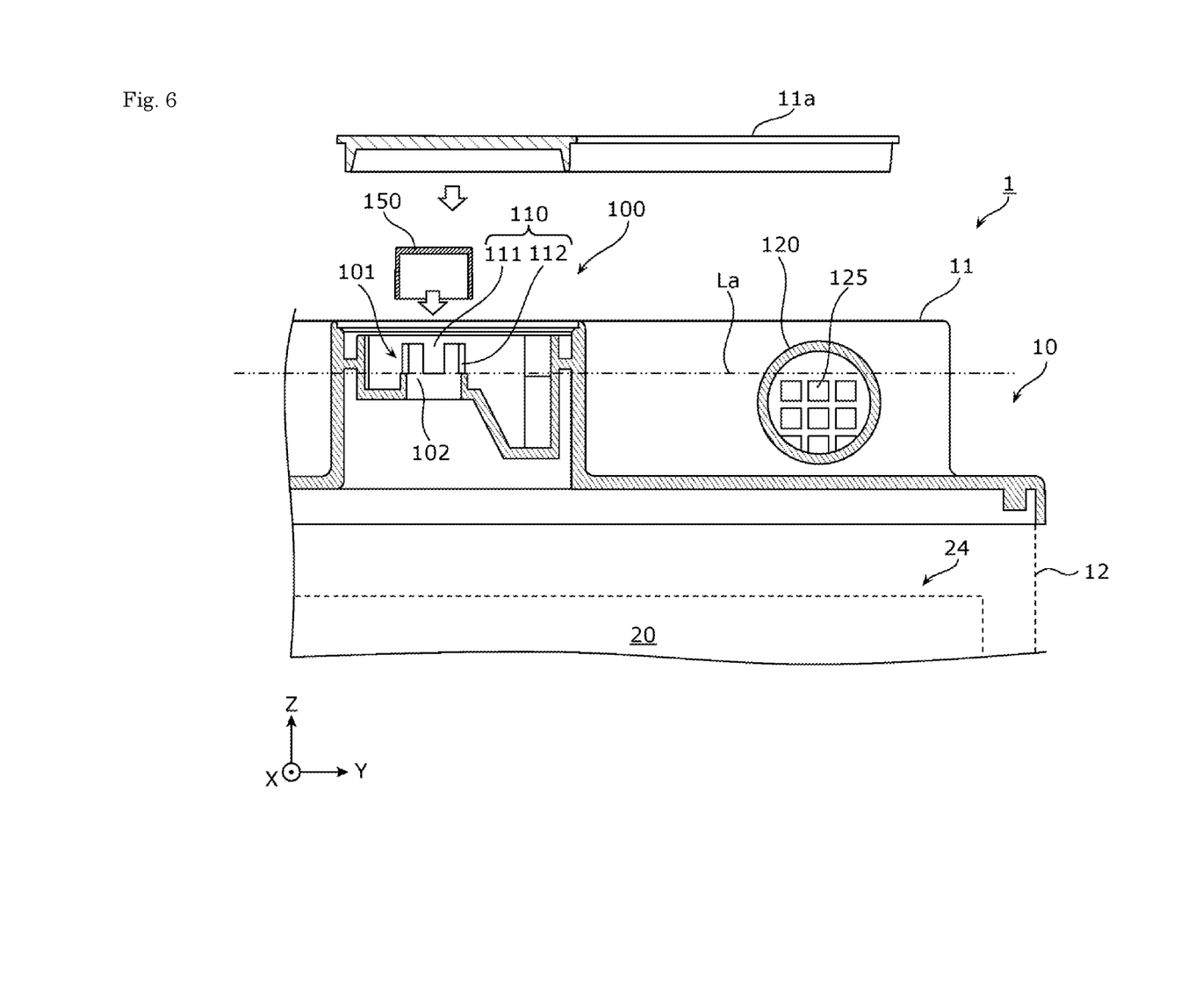
FIG. 6 is a side view illustrating a positional relationship between an exhaust port and an opening in the ventilation chamber of the embodiment.

FIG. 6 is a side view illustrating the positional relationship between the exhaust port 110 and the opening 125 in the ventilation chamber 100 of the embodiment. Specifically, FIG. 6 is a view illustrating the outer case 10 viewed from the positive side in the X-axis direction while being cut along a YZ plane passing through a line VI-VI in FIG. 5 such that the positions of the exhaust port 110 and the opening 125 can be understood. In FIG. 6, the valve member 150 and the ventilation chamber cover 11a are illustrated while shifted upward from the original positions, and approximate positions of the main body 12 of the outer case 10 and the energy storage device unit 24 (the plurality of energy storage devices 20) are illustrated by dotted lines.

As illustrated in FIG. 6, when a horizontal line (line parallel to the Y-axis direction) passing through the lower end of the exhaust port 110 disposed in the ventilation chamber 100 is represented by an alternate long and two short dashes line La, the opening 125 is disposed at the position lower than the alternate long and two short dashes line La.

That is, the energy storage apparatus 1 of the embodiment includes the plurality of energy storage devices 20 each of which includes the case 21 and the outer case 10 that accommodates the plurality of energy storage devices 20. The outer case 10 includes the ventilation chamber 100 and the opening 125. The exhaust port 110 guiding the gas discharged from the case 21 of at least one energy storage device 20 in the plurality of energy storage devices 20 to the inside of the ventilation chamber 100 and the valve member 150 closing the exhaust port 110 are disposed in the ventilation chamber 100. The opening 125 guides the gas discharged from the exhaust port 110 from the inside of the ventilation chamber 100 to the outside of the outer case 10. The opening 125 is formed at the position lower than the exhaust port 110 in the vertical direction.

According to this configuration, even when water flows into the ventilation chamber 100 from the opening 125, in the case where the position (water level) of the water surface reaches the upper end of the opening 125, the air above the water surface has no place to go inside the ventilation chamber 100. That is, the air reservoir is formed in the upper portion of the ventilation chamber 100. As a result, the inflow of the water is prevented by the pressure of the air reservoir. The water level at that time is substantially at the upper end of the opening 125 and is lower than the exhaust port 110.

As described above, in the embodiment, the opening 125 is at the position lower than the exhaust port 110 disposed in the ventilation chamber 100 and the gas (generally air) exists in the ventilation chamber 100, so that the water is hardly accumulated up to the height to the exhaust port 110. Accordingly, even when a situation where the outer case 10 is immersed in the water is generated, a possibility that the water reaches the energy storage devices 20 inside the outer case 10 is prevented. The pressure of the air reservoir acts in the direction in which the valve member 150 is brought into close contact with the exhaust port 110. For this reason, the decrease in the pressure of the air reservoir (increase in the water level) due to air leakage from the exhaust port 110 is substantially prevented. Accordingly, the possibility that the water invades from the exhaust port 110 into the inside of the outer case 10 can be reduced without depending on the existence or the level of airtightness or watertightness of the valve member 150 disposed in the exhaust port 110. Furthermore, when the water reaches the respective energy storage devices 20 from the outside of the outer case 10, the water needs to pass through the opening 125 and the exhaust port 110 closed by the valve member 150. Accordingly, as compared with the case where each of the gas release valves 23 of the plurality of energy storage devices 20 and the opening 125 are directly connected to each other by a pipe member or the like, the water hardly reaches each energy storage device 20.

As described above, the energy storage apparatus 1 of the embodiment is an energy storage apparatus with improved safety.

In the embodiment, as illustrated in FIGS. 5 and 6, the vent hole 118 is made in the ventilation chamber 100 for the purpose of the pressure balance between the inside and the outside of the outer case 10 in the normal state. Accordingly, when the vertical position of the vent hole 118 is higher than the lower end of the exhaust port 110, it is considered that the air accumulated in the upper portion of the ventilation chamber 100 escapes from the vent hole 118, so that the water level inside the ventilation chamber 100 reaches the exhaust port 110. However, in the embodiment, the inside of the outer case 10 is in the state where airtightness is maintained. Thus, when the water flows into the inside of the ventilation chamber 100 from the opening 125, the air leakage from the vent hole 118 closed by the ventilation waterproof film 119 to the inside of the outer case 10 is hardly generated. Accordingly, the effect of preventing the inflow of the water is exerted by the air reservoir in the upper portion of the ventilation chamber 100, whereby the possibility that the water reaches the exhaust port 110 is reduced. In order to further ensure this effect, the vertical position of the vent hole 118 may be lower than the lower end of the exhaust port 110. Thus, even when air leaks from the vent hole 118 to the inside of the outer case 10 during the inflow of the water from the opening 125 to the inside of the ventilation chamber 100, the vent hole 118 covered with the ventilation waterproof film 119 is submerged before the water level rises to the exhaust port 110. Thus, the air leakage from the vent hole 118 is not generated, and as a result, the possibility that the water reaches the exhaust port 110 is more reliably reduced. That is, the vertical position of the exhaust port 110 is preferably the position higher than both the vent hole 118 and the opening 125. More particularly, preferably the exhaust port 110 is located higher than the opening 125, and the opening 125 is located higher than the vent hole 118 (ventilation waterproof film 119).

In the embodiment, as illustrated in FIG. 3, a joining groove 11d that joins with ventilation chamber cover 11a is provided immediately above opening 125 (see FIG. 6) in the upper surface 11b of the lid body 11. Thus, the opening 125 is provided at the position slightly away from the upper surface 11b of the lid body 11 so as not to overlap the joining groove 11d. Furthermore, a hose or the like is connected to the exhaust tube 120 disposed at the position communicating the opening 125 in order to guide the gas to a distant place. For this reason the exhaust tube 120 is disposed while separated upward from the intermediate surface 11c (see FIG. 3) of the lid body 11 on which the external terminals 91 and 92 are disposed. As a result, as illustrated in FIG. 6, when viewed in the axial direction (X-axis direction) of the exhaust tube 120, the opening 125 is disposed at the position (a position biased toward the lower end) slightly away downward from the upper end of the inner diameter of the exhaust tube 120. That is, the exhaust tube 120 can be prevented from protruding outward from the outer case 10 by disposing the exhaust tube 120 in a step portion (see FIG. 3) formed by the upper surface 11b and the intermediate surface 11c having different height positions of the lid body 11. In this structure, the exhaust tube 120 is disposed at the position close to the upper surface 11b of the lid body 11. Thus, interference between the hose or the like connected to the exhaust tube 120 and the intermediate surface 11c of the lid body 11 is avoided, and as a result, the hose or the like can be easily connected to the exhaust tube 120. Furthermore, the opening 125 is disposed at the position slightly away from the upper surface 11b of the lid body 11. That is, the opening 125 is disposed at the position biased to the lower end of the inner diameter with respect to the inner diameter of the exhaust tube 120. Thus, a sufficient joining margin between the ventilation chamber cover 11a and the lid body 11 (the depth of the joining groove 11d) can be secured, and the gas discharged from the opening 125 can be guided to the inside of the exhaust tube 120.

In the embodiment, the exhaust port 110 includes the distal end exhaust portion 111 formed at the upper end of the cylindrical body 101 provided inside the ventilation chamber 100 and the side surface exhaust portion 112 penetrating the side wall 102 of the cylindrical body 101. The opening 125 is formed at the position lower than the side surface exhaust portion 112 in the vertical direction.

According to this configuration, the exhaust port 110 includes the distal end exhaust portion 111 and the side surface exhaust portion 112 having different orientations from each other. Thus, as compared with the case where the gas is discharged only upward from the cylindrical body 101, the gas generated in the outer case 10 can be efficiently guided to the inside of the ventilation chamber 100. In the distal end exhaust portion 111 and the side surface exhaust portion 112, the side surface exhaust portion 112 located at the lower position is located higher than the opening 125, so that the water hardly invades through the side surface exhaust portion 112. That is, the efficiency of exhaust from the exhaust port 110 can be improved while the invasion of the water into the exhaust port 110 is prevented.

In the embodiment, as illustrated in FIG. 2, each of the plurality of energy storage devices 20 is disposed while the gas release valve 23 of the case 21 of the energy storage device 20 faces upward. The ventilation chamber 100 is disposed at the position higher than the plurality of energy storage devices 20 in the vertical direction.

According to this configuration, the gas discharged from the upward gas release valve 23 of each of the plurality of energy storage devices 20 can be efficiently discharged to the outside of the outer case 10 through the ventilation chamber 100 while the possibility that the water reaches the plurality of energy storage devices 20 through the ventilation chamber 100 is reduced.

In the embodiment, the exhaust port 110 and the opening 125 are disposed at different positions in the lateral direction (the Y-axis direction in the embodiment) orthogonal to the vertical direction.

That is, because it is sufficient that the position of the opening 125 is lower than the exhaust port 110 in the vertical direction, it is also possible to make the positions in the lateral direction substantially the same by arranging the exhaust port 110 and the opening 125 in the vertical direction. However, in the embodiment, the exhaust port 110 and the opening 125 are disposed at different positions in the lateral direction. Thus, the heights of the exhaust port 110 and the opening 125 can be differentiated while the width in the height direction of the ventilation chamber 100 is kept as small as possible. That is, the structure that improves the safety from the viewpoint of the waterproof property can be included in the energy storage apparatus 1 without increasing the size of the energy storage apparatus 1.

Although the energy storage apparatus 1 of the embodiment has been described above, the energy storage apparatus 1 may have a configuration different from the configuration in FIGS. 3 to 6 with respect to the configuration of the ventilation chamber 100 and the periphery of the ventilation chamber 100. A modification example of the ventilation chamber 100 in the energy storage apparatus 1 regarding on a difference from the above-mentioned embodiment will be described.

Modification Example

Figure 7:
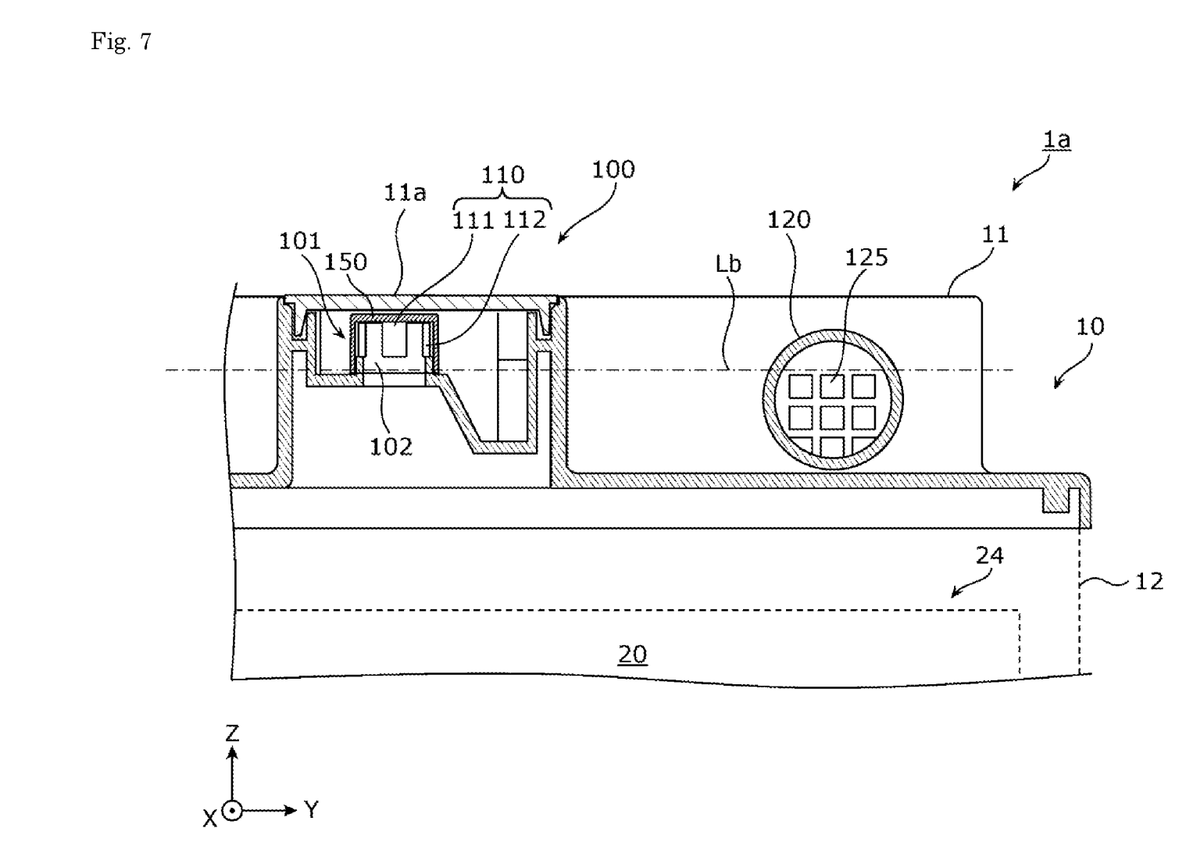
FIG. 7 is a side view illustrating a positional relationship between an exhaust port and an opening that are included in an energy storage apparatus according to a modification example of the embodiment.

FIG. 7 is a side view illustrating a positional relationship between the exhaust port 110 and the opening 125 that are included in an energy storage apparatus 1a according to a modification example of the embodiment. Specifically, in FIG. 7, similarly to FIG. 6 described above, the exhaust port 110 and the opening 125 are illustrated while a part of the outer case 10 is cut, and approximate positions of the main body 12 of the outer case 10 and the energy storage device units 24 (the plurality of energy storage devices 20) are illustrated by a dotted line.

As illustrated in FIG. 7, the exhaust port 110 is formed in the cylindrical body 101 disposed inside the ventilation chamber 100, and the exhaust port 110 is covered with the valve member 150. That is, the lower end of the valve member 150 is located lower than the lower end of the exhaust port 110. These points are the same as those of the embodiment. The modification example is characterized in that the position of the opening 125 is lower than the lower end (alternate long and two short dashes line Lb in FIG. 7) of the valve member 150.

That is, in the modification example, the valve member 150 is a cap-shaped member that closes the distal end exhaust portion 111 and the side surface exhaust portion 112, and the opening 125 is formed at the position lower than the lower end of the valve member 150 in the vertical direction.

According to this configuration, the water flowing into the ventilation chamber 100 from the opening 125 hardly reaches the lower end of the valve member 150. As a result, the possibility that the water crawls up due to a capillary phenomenon of the gap between the lower end edge of the valve member 150 and the cylindrical body 101 is reduced. Accordingly, the invasion of the water into the inside of the outer case 10 from the side surface exhaust portion 112 provided in the side wall 102 of the cylindrical body 101 is prevented.

Other Embodiments

As described above, the energy storage apparatuses of the embodiment and the modification example of the present invention have been described. However, the present invention is not limited to the above embodiment and modification. Various modifications made by those skilled in the art that are performed to the above embodiment or modification example are also included in the scope of the present invention without departing from the gist of the present invention.

The position of the ventilation chamber 100 where the exhaust port 110 and the like are disposed is not necessarily the upper portion of the outer case 10. The ventilation chamber 100 may be provided on the side surface of the outer case 10. Even in this case, the opening 125 is formed at the position lower than the exhaust port 110 in the vertical direction, so that the water level in the ventilation chamber 100 hardly rises to the exhaust port 110 when the water flows into the ventilation chamber 100 from the opening 125. As a result, the invasion of the water into the inside of the outer case 10 from the exhaust port 110 is prevented.

Although the cylindrical body 101 has the cylindrical shape, it is not essential that the cylindrical body has the cylindrical shape, and a cylindrical body having an elliptic shape, an oval shape, or a polygonal shape when viewed from the axial direction may be provided in the outer case 10. In this case, the shape of the valve member may be determined according to the shape of the cylindrical body.

In the cylindrical body 101, the side surface exhaust portion 112 may not be formed in a notch shape from the distal end. A through-hole provided in the side wall 102 of the cylindrical body 101 may be disposed in the cylindrical body 101 as the side surface exhaust portion 112. That is, the distal end exhaust portion 111 and the side surface exhaust portion 112 may not be continuous. It is not essential that the exhaust port 110 includes the distal end exhaust portion 111 and the side surface exhaust portion 112. Only one of the distal end exhaust portion 111 and the side surface exhaust portion 112 may be disposed as the exhaust port 110 in the cylindrical body 101.

The exhaust port 110 may not be formed in the portion provided in a protruding shape in the ventilation chamber 100 such as the cylindrical body 101. One through-hole formed in a floor surface (the surface on the negative side in the Z-axis direction) of the ventilation chamber 100 may function as the exhaust port 110. In this case, the valve member 150 may be a member that transitions from the closed state to the open state due to the deformed or movement by receiving the internal pressure of the outer case 10. A rubber stopper that is inserted into the exhaust port 110 from the side of the ventilation chamber 100 to be fitted in the exhaust port 110 may be adopted as the valve member 150.

A form constructed by any combination of the plurality of components explained above is also included in the scope of the present invention.

INDUSTRIAL APPLICABILITY

The present invention can be applied to the energy storage apparatus including the energy storage device such as a lithium ion secondary battery.

DESCRIPTION OF REFERENCE SIGNS 1, 1a: energy storage apparatus
10: outer case
11a: ventilation chamber cover
20: energy storage device
21: case
23: gas release valve
100: ventilation chamber
101: cylindrical body
102: side wall
110: exhaust port
111: distal end exhaust portion
112: side surface exhaust portion
118: vent hole
119: ventilation waterproof film
120: exhaust tube
125: opening
150: valve member
151: front surface portion
152: outer periphery

The invention claimed is:
1. An energy storage apparatus comprising:
a plurality of energy storage devices each of which includes a case; and
an outer case that accommodates the plurality of energy storage devices,
wherein the outer case includes:
a ventilation chamber in which an exhaust port through which gas discharged from the case of at least one energy storage device in the plurality of energy storage devices is guided to an inside of the ventilation chamber and a valve member that closes the exhaust port are disposed; and
an opening that guides the gas discharged from the exhaust port from the inside of the ventilation chamber to an outside of the outer case,
wherein the opening is formed lower than the exhaust port in a vertical direction,
wherein the exhaust port includes:
a distal end exhaust portion formed at an upper end of a cylindrical body provided inside the ventilation chamber; and
a side surface exhaust portion that penetrates a side wall of the cylindrical body, and
wherein the opening is formed lower than the side surface exhaust portion in the vertical direction.

2. The energy storage apparatus according to claim 1, wherein the valve member is a cap-shaped member that closes the distal end exhaust portion and the side surface exhaust portion, and
wherein the opening is formed lower than a lower end of the valve member in the vertical direction.

3. The energy storage apparatus according to claim 1, wherein each of the plurality of energy storage devices is disposed such that a gas release valve included in the case of the energy storage device faces upward, and
wherein the ventilation chamber is disposed higher than the plurality of energy storage devices in the vertical direction.

4. The energy storage apparatus according to claim 3, wherein the exhaust port and the opening are disposed at different positions in a lateral direction orthogonal to the vertical direction.

5. An energy storage apparatus comprising:
a plurality of energy storage devices each of which includes a case; and
an outer case that accommodates the plurality of energy storage devices,
wherein the outer case includes:
a ventilation chamber in which an exhaust port through which gas discharged from the case of at least one energy storage device in the plurality of energy storage devices is guided to an inside of the ventilation chamber and a valve member that closes the exhaust port are disposed; and
an opening that guides the gas discharged from the exhaust port from the inside of the ventilation chamber to an outside of the outer case,
wherein the opening is formed lower than the exhaust port in a vertical direction, and
wherein each of the plurality of energy storage devices is a lithium-ion battery.

6. The energy storage apparatus according to claim 5, wherein the outer case accommodates a control unit electrically connected to the plurality of energy storage devices.

7. The energy storage apparatus according to claim 6, wherein the outer case includes:
a main body in which a main body opening is formed to accommodate the plurality of energy storage devices; and
a lid body that that closes the main body opening, and
wherein the control unit is arranged between the plurality of energy storage devices and the lid body.

8. The energy storage apparatus according to claim 7, wherein the lid body includes the ventilation chamber and the opening.

9. The energy storage apparatus according to claim 1, wherein each of the plurality of energy storage devices is a lithium-ion battery.

* * * * *